(12) United States Patent
Jordan

(10) Patent No.: US 7,938,608 B1
(45) Date of Patent: May 10, 2011

(54) WALL SURFACE PROTECTING BOLT SUPPORT APPARATUS AND METHOD

(76) Inventor: Arthur L. Jordan, Forth Worth, TX (US)

( * ) Notice: Subject to any disclaimer, the term of this patent is extended or adjusted under 35 U.S.C. 154(b) by 138 days.

(21) Appl. No.: 12/365,951

(22) Filed: Feb. 5, 2009

(51) Int. Cl.
*F16B 39/282* (2006.01)
(52) U.S. Cl. .................. 411/187; 411/183
(58) Field of Classification Search ........... 411/133, 411/187, 997, 998, 367, 180
See application file for complete search history.

(56) References Cited

U.S. PATENT DOCUMENTS

| | | | |
|---|---|---|---|
| 26,563 A | 1/1897 | Heiser | |
| D26,563 S | 1/1897 | Heiser | |
| D29,517 S | 10/1898 | Larew | |
| 843,720 A * | 2/1907 | Waddell | 16/417 |
| 1,075,455 A | 10/1913 | Wine | |
| 1,149,454 A | 8/1915 | Layton | |
| 1,382,799 A | 6/1921 | Purple | |
| 1,497,882 A | 8/1922 | Rumely | |
| 1,432,943 A * | 10/1922 | Allis | 188/187 |
| 1,437,811 A | 12/1922 | Koel | |
| 1,545,182 A * | 7/1925 | Beck | 411/103 |
| 1,982,076 A * | 11/1934 | Spahn | 411/133 |
| 2,560,961 A | 7/1951 | Knohl | |
| 2,802,503 A | 8/1957 | Zupa | |
| 3,032,089 A | 5/1962 | Gutshall | |
| 3,160,188 A * | 12/1964 | Frank | 411/103 |
| 3,221,792 A | 12/1965 | Poupitch | |
| 3,305,987 A | 2/1967 | Weaver | |
| 3,449,997 A * | 6/1969 | Couch | 411/466 |
| 3,735,664 A | 5/1973 | Hermle | |
| 3,962,843 A | 6/1976 | King, Jr. | |
| 4,257,466 A | 3/1981 | Eisemann | |
| 4,372,701 A | 2/1983 | Watanabe | |
| D276,310 S | 11/1984 | Frieberg | |
| 5,096,349 A | 3/1992 | Landy et al. | |
| 5,546,723 A * | 8/1996 | Jones | 52/698 |
| 6,095,738 A * | 8/2000 | Selle | 411/427 |
| 6,193,456 B1 * | 2/2001 | Stumpf et al. | 411/180 |
| D442,064 S | 5/2001 | Chung | |
| 2007/0036630 A1 | 2/2007 | Clifton Butzer et al. | |

* cited by examiner

*Primary Examiner* — Gary Estremsky

(57) ABSTRACT

A wall surface protecting bolt support apparatus includes a bolt receiving member comprising a plate that has a first side, a second side and a peripheral edge. The plate has an aperture extending therethrough which extends into the first side and outwardly of the second side. A sleeve is attached to and extends away from the second side, the sleeve bounding the aperture. The sleeve has a distal end with respect to the plate. The distal end is open to allow a bolt to be extended through the aperture and through the sleeve. The sleeve is extendable through an opening in a wall surface and the second side is abuttable against the wall surface. The bolt is extended through the bolt receiving member and a head of the bolt is abuttable against the first side of the plate to prevent damage to the wall surface.

4 Claims, 2 Drawing Sheets

WALL SURFACE PROTECTING BOLT SUPPORT APPARATUS AND METHOD

BACKGROUND OF THE DISCLOSURE

Field of the Disclosure

The disclosure relates to wall protecting devices and more particularly pertains to a new wall protecting device for preventing damage to a wall by a bolt head.

SUMMARY OF THE DISCLOSURE

An embodiment of the disclosure meets the needs presented above by generally comprising a bolt receiving member comprising a plate that has a first side, a second side and a peripheral edge. The plate has an aperture extending therethrough which extends into the first side and outwardly of the second side. A sleeve is attached to and extends away from the second side, the sleeve bounding the aperture. The sleeve has a distal end with respect to the plate. The distal end is open to allow a bolt to be extended through the aperture and through the sleeve. The sleeve is extendable through an opening in a wall surface and the second side is abuttable against the wall surface. The bolt is extended through the bolt receiving member and a head of the bolt is abuttable against the first side of the plate to prevent damage to the wall surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
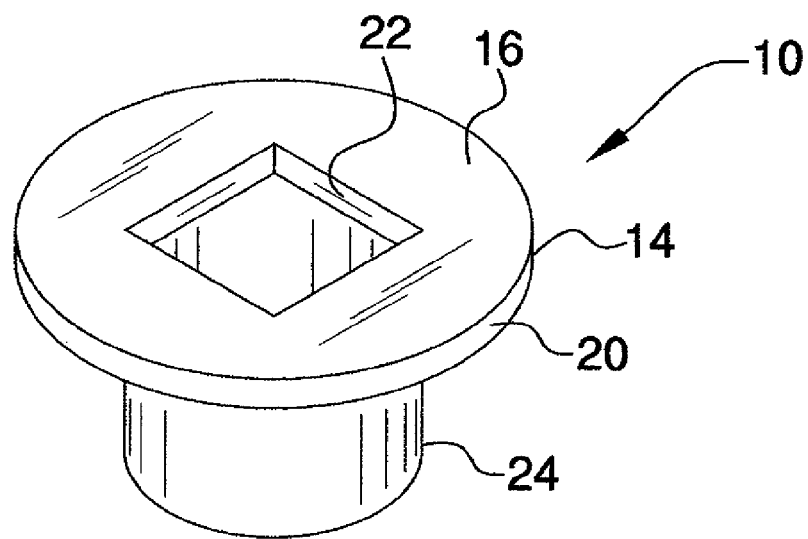
FIG. 1 is a top perspective view of a wall surface protecting bolt support apparatus and method according to an embodiment of the disclosure.
Figure 2:
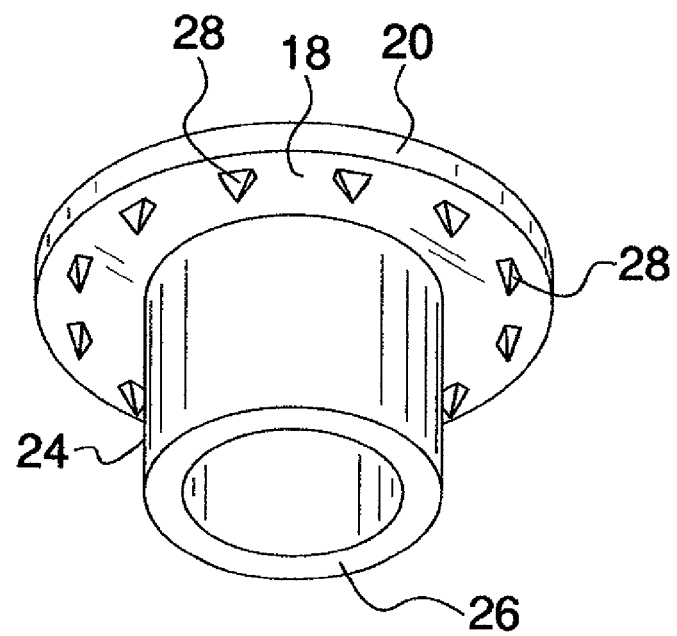
FIG. 2 is a bottom perspective view of an embodiment of the disclosure.
Figure 3:
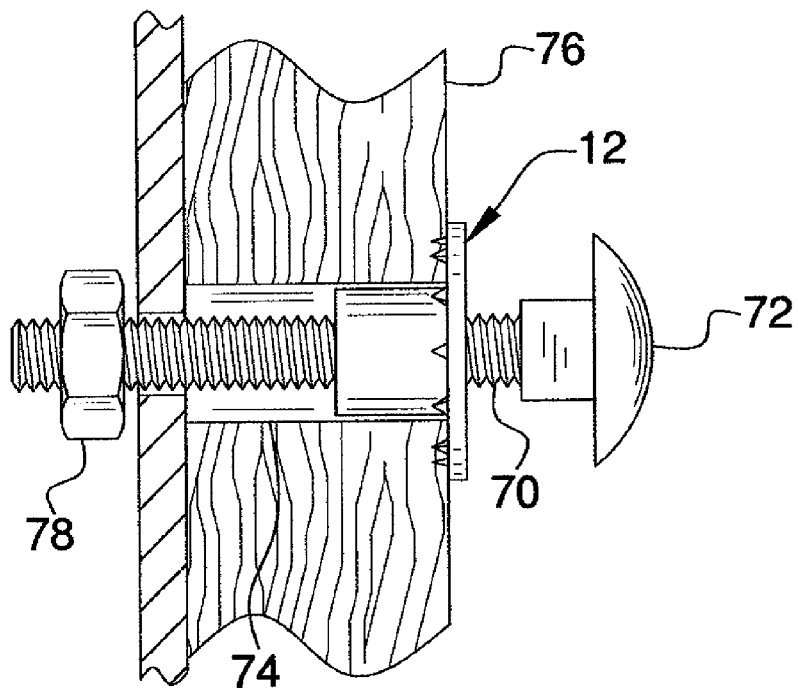
FIG. 3 is a side in-use view of an embodiment of the disclosure.
Figure 4:
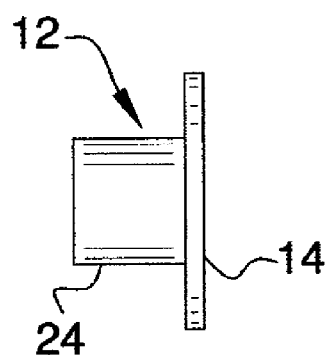
FIG. 4 is a side view of an embodiment of the disclosure.

With reference now to the drawings, and in particular to FIGS. 1 through 6 thereof, a new wall protecting device embodying the principles and concepts of an embodiment of the disclosure and generally designated by the reference numeral 10 will be described.

As best illustrated in FIGS. 1 through 6, the wall surface protecting bolt support apparatus 10 and method generally comprises a bolt receiving member 12 that includes a plate 14 having a first side 16, a second side 18 and a peripheral edge 20. The plate 14 has an aperture 22 extending therethrough which extends into the first side 16 and outwardly of the second side 18. The first side 16 has an annular shape. The plate 14 has a width of less than 3 inches and a height from the first side 16 to the second side 18 less than ¼ inch. The plate 14 may be comprised of any conventional rigid material such as a metal or a plastic. The aperture 22 may have a rectangular shape particularly well suited for receiving and seating a carriage bolt having a square section abutting a head 72 of the bolt 70. A sleeve 24 is attached to and extends away from the second side 18. The sleeve 24 bounds the aperture 22. The sleeve 24 has a distal end 26, with respect to the plate 14, which is open to allow the bolt 70 to be extended through the aperture 22 and through the sleeve 24. The sleeve 24 is extendable through an opening 74 in a wall surface 76 and the second side 14 is abuttable against the wall surface 76.

Figure 5:
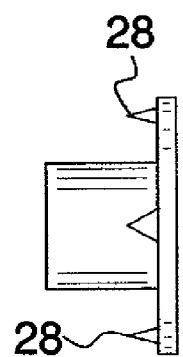
FIG. 5 is a side view of an embodiment of the disclosure.
Figure 6:
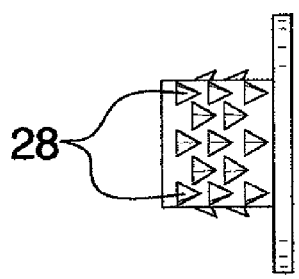
FIG. 6 is a side view of an embodiment of the disclosure.

A plurality of gripping members 28 may be attached to the bolt receiving member 12. The gripping members 28 being extendable into the wall surface 76 to retain the bolt receiving member 28 in the wall surface 76. The gripping members 28 include prongs attached to the second side 18 and positioned between the sleeve 24 and the peripheral edge 20. As shown in FIG. 6, the gripping members 28 may be prongs mounted on the sleeve and be angled toward the second side 18 of the plate 14. The gripping members shown in FIG. 5 are typically use with wood and drywall construction whereas those in FIG. 6 are used with wood, metal, drywall, and brick construction. It should be understood that the term "surface" when used with wall surface 761 may include all exposed surfaces of a wall including the surface of the opening 74.

In use, the bolt receiving member 12 is extended through the opening 74 and the second side 18 abutted against the wall surface 76. The bolt 70 is then extended through the bolt receiving member 12 and the head 72 of the bolt 70 is abuttable against the first side 16 of the plate 14 to prevent damage to the wall surface 76. When a nut 78 is placed on the bolt 70 and tightened, the plate 14 will prevent a head 72 of the bolt 70 from embedding into and damaging the wall surface 76.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A wall surface protecting assembly comprising:
    a bolt and a nut being threadably couplable to said bolt;
    a bolt receiving member comprising;
        a plate having a first side, a second side and a peripheral edge, said plate having an aperture extending therethrough, said aperture extending into said first side and outwardly of said second side;
        a sleeve being attached to and extending away from said second side, said sleeve bounding said aperture, said sleeve having a distal end with respect to said plate, said distal end being open to allow said bolt to be extended through said aperture and through said sleeve, said sleeve being extendable through an opening in a wall surface and said second side being abuttable against the wall surface;

a plurality of gripping members being attached to said bolt receiving member, said gripping members being extendable into the wall surface to retain said bolt receiving member in the wall surface, said gripping members including prongs attached to said second side and positioned between said sleeve and said peripheral edge, and wherein the bolt is extended through said bolt receiving member and a head of the bolt is abuttable against said first side of said plate to prevent damage to the wall surface and wherein said nut is thereafter threadably couplable to said bolt.

2. The assembly according to claim 1, wherein said aperture has a rectangular shape.

3. A wall surface protecting assembly comprising:

a bolt and a nut being threadably couplable to said bolt;

a bolt receiving member comprising;

a plate having a first side, a second side and a peripheral edge, said plate having an aperture extending therethrough, said aperture extending into said first side and outwardly of said second side, said first side having an annular shape;

a sleeve being attached to and extending away from said second side, said sleeve bounding said aperture, said sleeve having a distal end with respect to said plate, said distal end being open to allow a said bolt to be extended through said aperture and through said sleeve, said sleeve being extendable through an opening in a wall surface and said second side being abuttable against the wall surface;

a plurality of gripping members being attached to said bolt receiving member, said gripping members being extendable into the wall surface to retain said bolt receiving member in the wall surface, said gripping members including prongs attached to said second side and positioned between said sleeve and said peripheral edge; and wherein the bolt is extended through said bolt receiving member and a head of the bolt is abuttable against said first side of said plate to prevent damage to the wall surface and wherein said nut is thereafter threadably couplable to said bolt.

4. A method protecting a wall from a bolt head including the steps of:

extending a bolt receiving member through an opening in a wall surface, said a bolt receiving member comprising;

a plate having a first side, a second side and a peripheral edge, said plate having an aperture extending therethrough, said aperture extending into said first side and outwardly of said second side;

a sleeve being attached to and extending away from said second side, said sleeve bounding said aperture, said sleeve having a distal end with respect to said plate, said sleeve being extended through an opening in a wall surface and said second side being abutted against the wall surface;

gripping said wall surface by a plurality of gripping members being attached to said bolt receiving member, said gripping members including prongs attached to said sleeve and being angled toward said second side of said plate; and extending a bolt through said bolt receiving member and abutting a head of the bolt against said first side of said plate to prevent damage to the wall surface when the bolt head is pulled against the wall surface by a nut.

* * * * *